United States Patent
Woo et al.

(10) Patent No.: US 10,095,324 B2
(45) Date of Patent: Oct. 9, 2018

(54) METHOD FOR HANDLING PEN MULTI-INPUT EVENT AND APPARATUS FOR THE SAME

(71) Applicant: Samsung Electronics Co., Ltd., Suwon-si, Gyeonggi-do (KR)

(72) Inventors: Jeong Woo, Daegu (KR); Eun-Yeung Lee, Chilgok-gun (KR); Hyun-Suk Choi, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/307,927

(22) Filed: Jun. 18, 2014

(65) Prior Publication Data

US 2015/0002457 A1 Jan. 1, 2015

(30) Foreign Application Priority Data

Jun. 28, 2013 (KR) .......................... 10-2013-0075089

(51) Int. Cl.
*G06F 3/0354* (2013.01)
*G06F 3/046* (2006.01)

(52) U.S. Cl.
CPC .......... *G06F 3/03545* (2013.01); *G06F 3/046* (2013.01); *G06F 2203/04104* (2013.01)

(58) Field of Classification Search
None
See application file for complete search history.

(56) References Cited

U.S. PATENT DOCUMENTS

| | | | |
|---|---|---|---|
| 5,751,229 A | 5/1998 | Funahashi | |
| 6,307,511 B1 | 10/2001 | Ying et al. | |
| 2001/0038384 A1 | 11/2001 | Fukushima et al. | |
| 2004/0095333 A1* | 5/2004 | Morag | G06F 3/03545 345/173 |
| 2004/0239652 A1* | 12/2004 | Taylor | G06F 3/0346 345/179 |
| 2005/0024347 A1 | 2/2005 | Choi | |
| 2007/0033012 A1 | 2/2007 | Rosenberg | |
| 2008/0012835 A1* | 1/2008 | Rimon | G06F 3/038 345/173 |
| 2009/0024988 A1 | 1/2009 | Edgecomb et al. | |
| 2009/0167702 A1* | 7/2009 | Nurmi | G06F 3/0346 345/173 |
| 2009/0172606 A1 | 7/2009 | Dunn et al. | |
| 2009/0184849 A1 | 7/2009 | Nasiri et al. | |

(Continued)

FOREIGN PATENT DOCUMENTS

| | | |
|---|---|---|
| CN | 1278955 A | 1/2001 |
| CN | 1679078 A | 10/2005 |

(Continued)

*Primary Examiner* — Matthew Yeung
(74) *Attorney, Agent, or Firm* — Jefferson IP Law, LLP

(57) ABSTRACT

An electronic device and method are provided. The electronic device includes an electromagnetic resonant panel, an electromagnetic controller configured to detect input values, which are induced in multiple locations of the electromagnetic resonant panel by at least one resonant circuit of an input pen, and a controller configured to detect a pen multi-input event based on the detected input values, and to control an operation corresponding to the detected pen multi-input event.

18 Claims, 14 Drawing Sheets

(56) References Cited

U.S. PATENT DOCUMENTS

| | | | |
|---|---|---|---|
| 2010/0073321 A1* | 3/2010 | Tseng | G06F 3/0488 345/174 |
| 2010/0214237 A1* | 8/2010 | Echeverri | G06F 3/04883 345/173 |
| 2010/0270090 A1 | 10/2010 | Yeh et al. | |
| 2011/0155479 A1* | 6/2011 | Oda | G06F 3/03545 178/18.06 |
| 2012/0068975 A1 | 3/2012 | Wei et al. | |
| 2012/0068984 A1 | 3/2012 | Chen et al. | |
| 2012/0139849 A1* | 6/2012 | Syu | G06F 3/0416 345/173 |
| 2012/0169663 A1 | 7/2012 | Kim et al. | |
| 2013/0009907 A1* | 1/2013 | Rosenberg | G06F 3/046 345/174 |
| 2013/0016064 A1 | 1/2013 | Lee | |
| 2013/0021362 A1 | 1/2013 | Sakurada et al. | |
| 2013/0082976 A1 | 4/2013 | Kang | |
| 2013/0088465 A1* | 4/2013 | Geller | G06F 3/03545 345/179 |
| 2013/0106731 A1 | 5/2013 | Yilmaz et al. | |
| 2014/0253465 A1* | 9/2014 | Hicks | G06F 3/03545 345/173 |
| 2014/0325402 A1 | 10/2014 | Jung et al. | |
| 2014/0327659 A1 | 11/2014 | Chen | |
| 2016/0062492 A1* | 3/2016 | Geller | G06F 3/03545 345/179 |

FOREIGN PATENT DOCUMENTS

| | | |
|---|---|---|
| CN | 2012-59668 Y | 6/2009 |
| CN | 102141867 A | 8/2011 |
| CN | 102609163 A | 7/2012 |
| JP | 2004-139286 A | 5/2004 |
| JP | 2011-81646 A | 4/2011 |
| KR | 2001-319831 A | 11/2001 |
| TW | 2010-39225 A | 11/2010 |

* cited by examiner

METHOD FOR HANDLING PEN MULTI-INPUT EVENT AND APPARATUS FOR THE SAME

CROSS-REFERENCE TO RELATED APPLICATION(S)

This application claims the benefit under 35 U.S.C. § 119(a) of a Korean patent application filed on Jun. 28, 2013 in the Korean Intellectual Property Office and assigned Serial No. 10-2013-0075089, the entire disclosure of which is hereby incorporated by reference.

TECHNICAL FIELD

The present disclosure relates to control of inputs on a multi-input screen. More particularly, the present disclosure relates to a method and apparatus for controlling inputs made by a pen input device on a multi-input screen.

BACKGROUND

With the improvement of the performance of electronic devices, the recent electronic devices no longer provide only the simple single feature. For example, a mobile terminal such as a smart phone may provide a variety of countless features such as features of a multimedia player, an Electronic-book (E-book) reader, a document editor, a game console and the like.

In line with the development trend of electronic devices, the recent electronic devices generally use a multi-input screen, such as a touch screen, allowing users to control several operations of the electronic devices by making an input on the display screen that provides multi-input capabilities. For example, a user may run a specific application, or request access to specific data (for example, read document data) by making an input on a multi-input screen.

A keyboard or icons displayed on the multi-input screen of various electronic devices may be selected by an input from a user. For example, the input may be made using the user's body (for example, a fingertip). However, due to a decrease in a gap between icons or in a size of the icons, malfunctions may occur if the icons are selected based on an input using the fingertip. For example, if an input is made such that points around the desired point are selected together with the desired point, or if an input causes selection of a part adjacent to the desired location that is recognized first even though the input also causes selection of the desired location, then malfunctions may occur in which the functions unwanted by the user may be executed.

To address this problem, a pen input device has been used. The pen input device may be provided to correspond to a multi-input screen driving scheme. For example, the multi-input screen driving scheme may be classified into a resistive scheme for detecting a change in pressure to detect a touch input, a capacitive scheme for detecting a change in capacitance, and an acoustic wave scheme for detecting a change in resonant frequency.

In the case of the acoustic wave scheme for detecting a change in resonant frequency, an input is detected using a resonant frequency generated in the multi-input screen, and a pen input device is used to make the input. This acoustic wave multi-input screen has been widespread due to its excellent input recognition, but its input ways are limited.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus capable of diversifying input ways implemented by a pen input device on the acoustic wave multi-input screen.

In accordance with an aspect of the present disclosure, an electronic device is provided. The electronic device includes an electromagnetic resonant panel, an electromagnetic controller configured to detect input values, which are induced in multiple locations of the electromagnetic resonant panel by at least one resonant circuit of an input pen, and a controller configured to detect a pen multi-input event based on the detected input values, and to control an operation corresponding to the detected pen multi-input event.

In accordance with another aspect of the present disclosure, a method for handling a pen input is provided. The method includes providing a driving signal for an electromagnetic resonant panel, detecting input values, which are induced in multiple locations of the electromagnetic resonant panel by at least one resonant circuit of an input pen, detecting a pen multi-input event based on the detected input values, and controlling an operation corresponding to the detected pen multi-input event.

In accordance with further another aspect of the present disclosure, a computer-readable storage medium is provided. The computer-readable storage medium includes a stored at least one program for execution by at least one controller to perform the above method.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
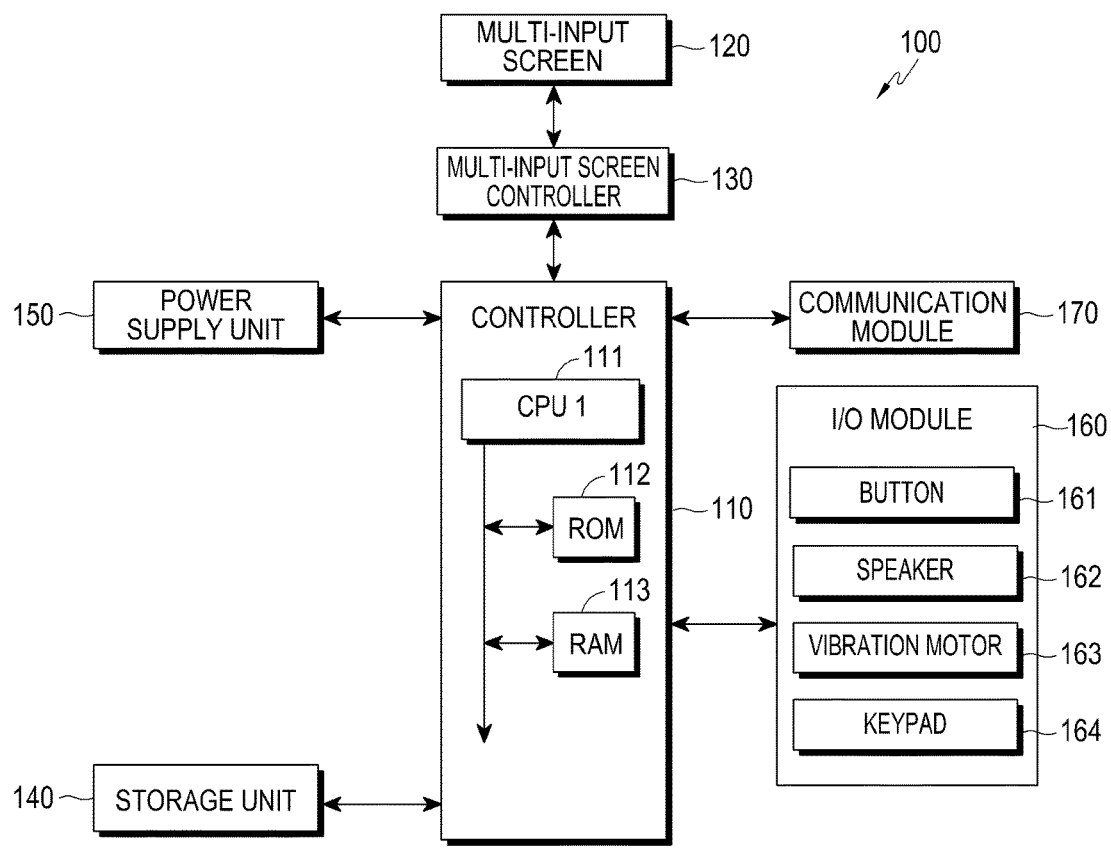
FIG. 1 illustrates an electronic device according to an embodiment of the present disclosure.

FIG. 1 illustrates an electronic device according to an embodiment of the present disclosure.

Referring to FIG. 1, an electronic device 100 may include a controller 110, a multi-input screen 120, a multi-input screen controller 130, a storage unit 140, a power supply unit 150, an Input/Output (I/O) module 160, and a communication module 170.

The controller 110 may include a Central Processing Unit (CPU) 111, a Read Only Memory (ROM) 112 for storing a control program for control of the electronic device 100, and a Random Access Memory (RAM) 113 used to temporarily memorize signals or data received from the outside of the electronic device 100, or used as a working space for operations performed in the electronic device 100. The CPU 111, the ROM 112 and the RAM 113 may be interconnected via an internal bus. The controller 110 may control components of the electronic device 100, such as the multi-input screen 120, the multi-input screen controller 130, the storage unit 140, the power supply unit 150, the I/O module 160, and the communication module 170. The controller 110 may include a single-core CPU, or a multi-core CPU such as a dual-core CPU, a triple-core CPU or a quad-core CPU. It will be apparent to those of ordinary skill in the art that the number of cores is subject to change depending on the characteristics of the electronic device.

The multi-input screen 120 may display User Interfaces (UIs) corresponding to various services (for example, a call service, a data transmission service, a broadcasting service, and a photo service), for the user based on the Operating System (OS) of the electronic device 100. The multi-input screen 120 may transmit an analog signal corresponding to at least one input made to a UI, to the multi-input screen controller 130. The multi-input screen 120 may receive at least one input event through a user's body (for example, fingers including the thumb), or through a pen input device (for example, a stylus pen). The multi-input screen 120 may determine or check a gesture input made by continuously inputting a multi-input input event among the at least one multi-input input event. The multi-input screen 120 may transmit an analog signal corresponding to a gesture for an input event that is continuously input, to the multi-input screen controller 130.

The multi-input screen controller 130 may control an output value of the multi-input screen 120 so that display data provided from the controller 110 may be displayed on the multi-input screen 120. The multi-input screen controller 130 may convert an analog signal received from the multi-input screen 120 into a digital signal (for example, X and Y coordinates), and transmit the digital signal to the controller 110. The controller 110 may control the multi-input screen 120 using the digital signal received from the multi-input screen controller 130. For example, the controller 110 may select and/or run a shortcut icon (not shown) displayed on the multi-input screen 120 in response to an input event, such as a touch event or a hovering event. The multi-input screen controller 130 may be incorporated into the controller 110.

The multi-input screen 120 may be implemented in, for example, a resistive type, a capacitive type, an infrared type, an acoustic wave type, or any other similar and/or suitable type. The multi-input screen controller 130 may control an operation of the multi-input screen 120, and provide a signal or data for detecting an input event.

The multi-input screen 120 may be configured to detect an input event using a resonance scheme. Herein, while certain embodiments of the present disclosure will be described herein in the context of the resonance scheme for conciseness in explanation, the present disclosure is not limited thereto and is equally applicable to other similar and/or suitable schemes for detecting an input event. Embodiments of the present disclosure implementing the resonance scheme are described below with reference to FIGS. 2-5.

Figure 2:
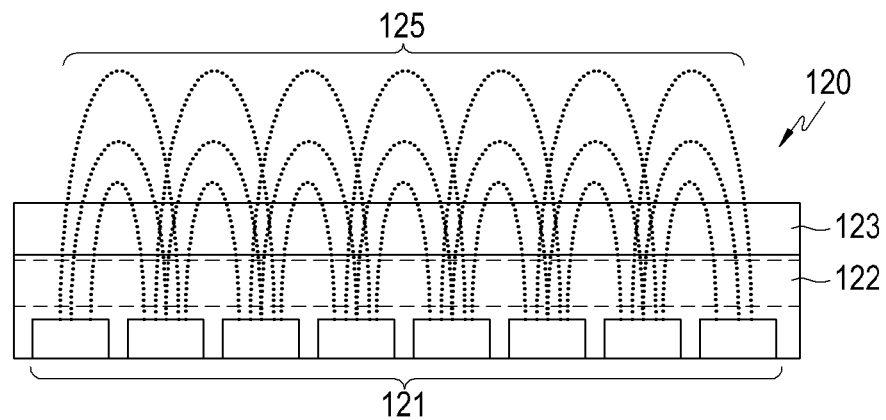
FIG. 2 is a cross sectional view illustrating a structure of a multi-input screen mounted in an electronic device according to an embodiment of the present disclosure.

FIG. 2 is a cross sectional view illustrating a structure of a multi-input screen mounted in an electronic device according to an embodiment of the present disclosure.

Referring to FIG. 2, the multi-input screen 120 may include a multi-input panel (e.g., an electromagnetic resonant panel and/or a touch panel) 121, a window 123 provided over the multi-input panel 121, and a display panel 122 provided between the multi-input panel 121 and the window 123. The multi-input panel 121 may receive a signal provided from the multi-input screen controller 130, and control an operation corresponding thereto. In other words, the multi-input panel 121 may include a plurality of resonance circuits that can radiate a predetermined resonant signal 125 to a range of a predetermined area upon receiving a driving signal from the multi-input screen controller 130.

Figure 3:
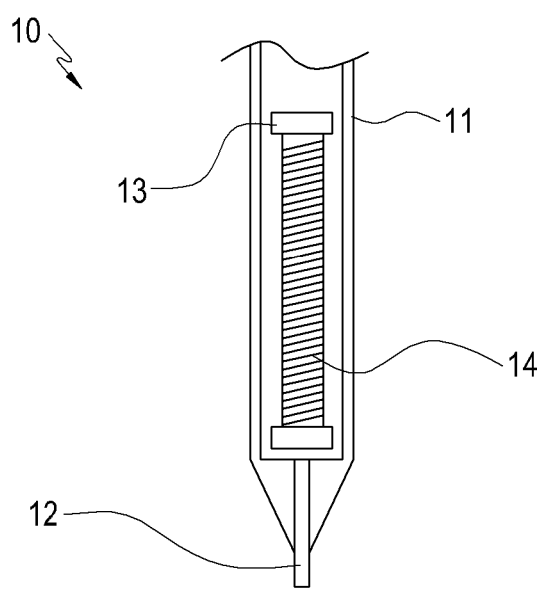
FIG. 3 is a cross sectional view illustrating a structure of a pen input device for generating an input event in an electronic device according to an embodiment of the present disclosure.

FIG. 3 is a cross sectional view illustrating a structure of a pen input device for generating an input event in an electronic device according to an embodiment of the present disclosure.

Referring to FIG. 3, a pen input device 10 may include a body 11 having a tip 12 which may make a contact with, for example, the multi-input screen 120, and in the body 11 may be mounted a substrate (not shown) and a core 13 on which a coil 14 is wound. Internal components of the pen input device 10, including the core 13 on which the coil 14 is wound, may constitute a resonance circuit (not shown) so as to operate with a resonant signal of a predetermined frequency. Therefore, if the internal components of the pen input device 10, which include the core 13 on which the coil 14 is wound and constitute the resonance circuit (not shown), enter an area in which a resonant signal (for example, a first resonant signal) comprised of the predetermined resonant frequency is generated, the internal components may generate electromotive force by the resonant signal (or the first resonant signal) comprised of the predetermined resonant frequency, and output a resonant signal (for example, a second resonant signal) 17 with a certain frequency corresponding to the resonant signal (or the first resonant signal). While the pen 10 is described above with only one core 13, the pen 10 may include a plurality of cores 13 in other embodiments.

FIGS. 4A to 4D illustrate an operation of detecting an input event in an electronic device according to an embodiment of the present disclosure.

Figure 4A:
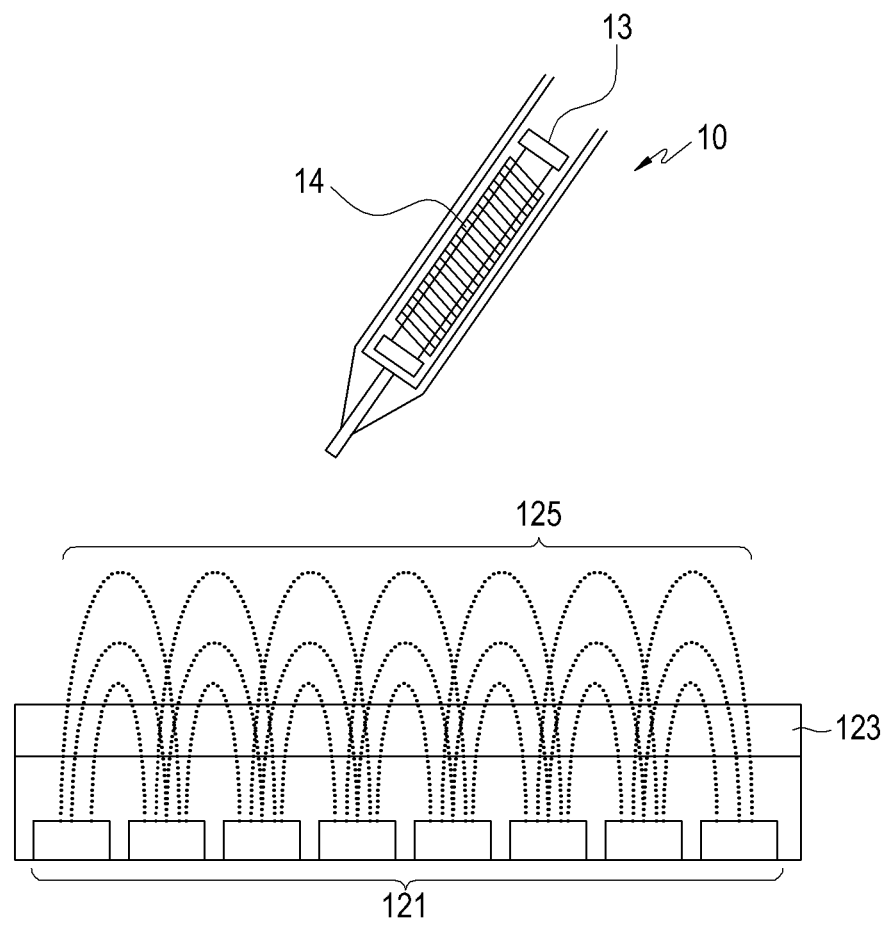
FIGS. 4A, 4B, 4C, and 4D illustrate an operation of detecting an input event in an electronic device according to an embodiment of the present disclosure.
Figure 4B:
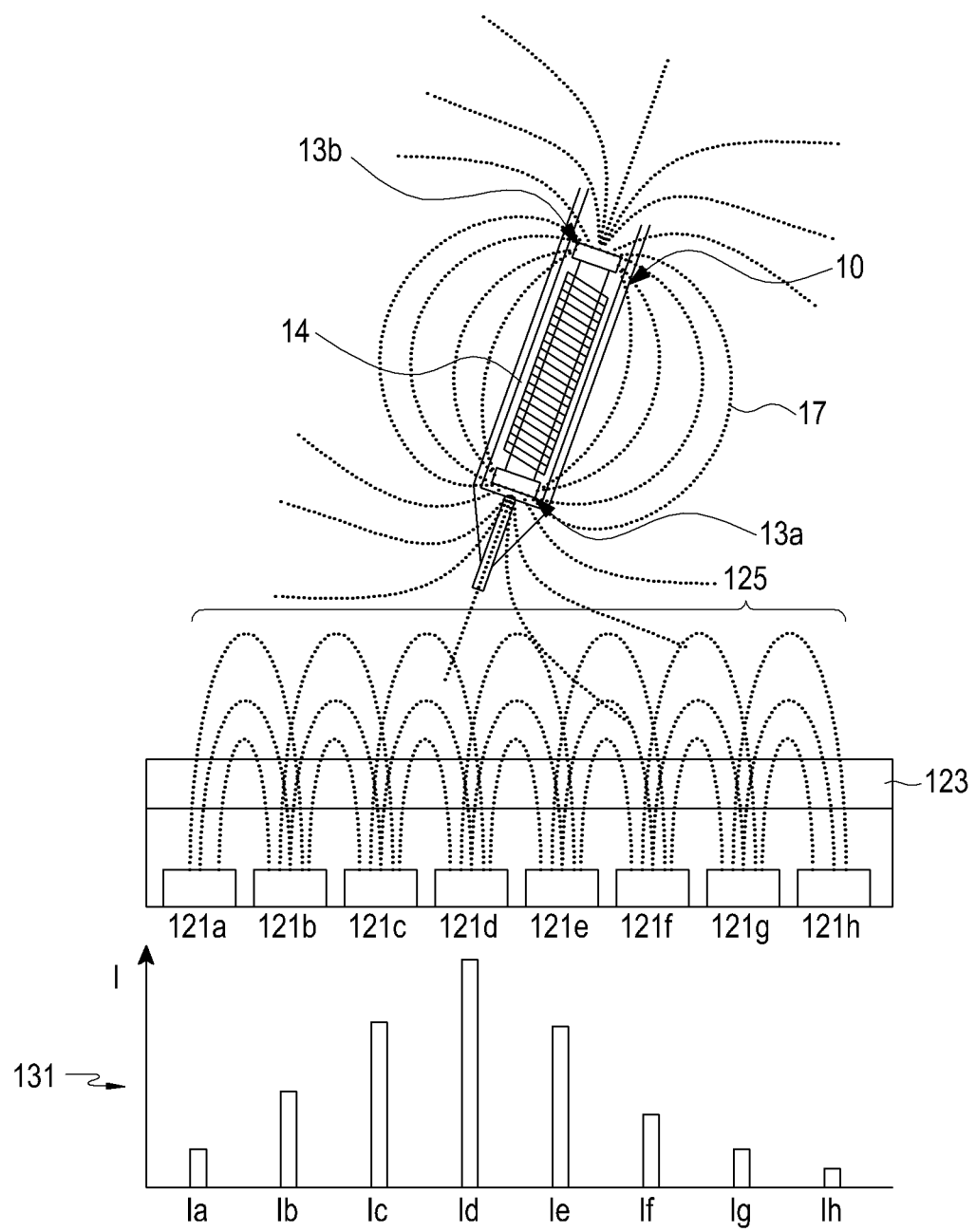

As illustrated in FIG. 4A, if the pen input device 10 does not enter a range of a predetermined area while the multi-input panel 121 radiates a predetermined resonant signal 125 to the range of the predetermined area using a resonance circuit, no electromagnetic field may be formed around the core 13 of the pen input device 10, so the multi-input panel 121 may detect no pen input event. However, as illustrated in FIG. 4B, if the pen input device 10 enters the range of the predetermined area in which the predetermined resonant signal 125 radiated by the multi-input panel 121 exists, then a resonance circuit of the multi-input panel 121 may be electromagnetically coupled to a resonance source including the core 13 of the pen input device 10. Accordingly, the predetermined resonant signal 125 may be induced in the resonance circuit of the pen input device 10, and an electromagnetic field 17 may be formed around the core 13 by the resonance circuit of the pen input device 10. The electromagnetic field 17 may be formed so that ends 13a and 13b of the core 13 of the pen input device 10 may have the largest current value, and may also be formed so that the ends 13a and 13b of the core 13 may be electromagnetically coupled to the multi-input panel 121 to have the largest coupling force. As a result, the mobility of charges may be high in an area corresponding to the ends 13a and 13b of the core 13, which have the largest electromagnetic coupling force, and as to a current value measured in the multi-input panel 121, the area corresponding to the ends 13a and 13b of the core 13 may have the largest current value. Since the multi-input screen controller 130 detects a pen input event on the basis of the current value measured in the multi-input panel 121, the multi-input screen controller 130 may determine that a pen input event has occurred in the area corresponding to the ends 13a and 13b of the core 13.

For example, as illustrated in FIG. 4B, as the pen input device 10 enters the range of the predetermined area, in which the predetermined resonant signal 125 exists, while being approximately perpendicular to the multi-input panel 121, i.e., as the first end 13a of the core 13 enters the range of the predetermined area, in which the predetermined resonant signal 125 exists, the electromagnetic field 17 may be formed around the core 13 by the resonance circuit of the pen input device 10. Therefore, the resonance circuit of the pen input device 10 may be electromagnetically coupled to the resonance circuit of the multi-input panel 121, and in particular, among a plurality of resonant antennas 121a to 121h mounted in the resonance circuit of the multi-input panel 121, the fourth resonant antenna 121d, which is closest to the first end 13a of the core 13, may be most strongly coupled to the resonance circuit of the pen input device 10. Consequently, a current determined by means of the multi-input panel 121 and the multi-input screen controller 130 may have the largest value at the fourth resonant antenna 121d as illustrated in a graph 131. In conclusion, the multi-input screen controller 130 may determine that a pen input event (for example, a single-pen single-input event) made by the pen input device 10 has occurred in the area where the fourth resonant antenna 121a is prepared.

Figure 4C:
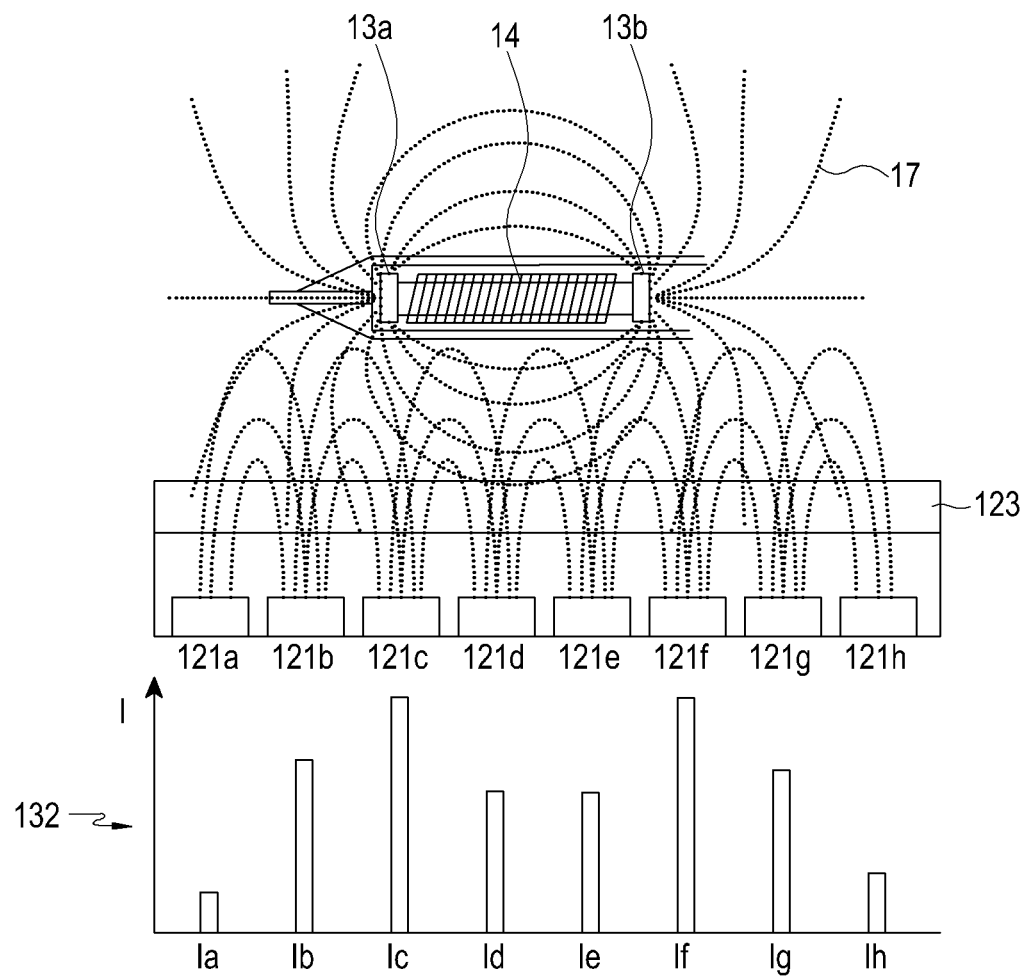

As illustrated in FIG. 4C, as the pen input device 10 enters the range of the predetermined area, in which the predetermined resonant signal 125 exists, while being approximately in parallel to the multi-input panel 121, i.e., as the first and second ends 13a and 13b of the core 13 simultaneously enter the range of the predetermined area, in which the predetermined resonant signal 125 exists, the electromagnetic field 17 may be formed in the vicinity of the core 13 by the resonance circuit of the pen input device 10. Therefore, the resonance circuit of the pen input device 10 may be electromagnetically coupled to the resonance circuit of the multi-input panel 121, and in particular, among the plurality of resonant antennas 121a to 121h mounted in the resonance circuit of the multi-input panel 121, the third resonant antenna 121c closest to the first end 13a of the core 13 and the sixth resonant antenna 121f closest to the second end 13b of the core 13 may be strongly coupled to the resonance circuit of the pen input device 10. Consequently, a current determined by means of the multi-input panel 121 and the multi-input screen controller 130 may have a larger value at the third and sixth resonant antennas 121c and 121f as illustrated in a graph 132. In conclusion, the multi-input screen controller 130 may determine that a pen input event (for example, a pen multi-input event) made by the pen input device 10 has occurred in two areas where the third and sixth resonant antennas 121c and 121f are prepared.

Figure 4D:
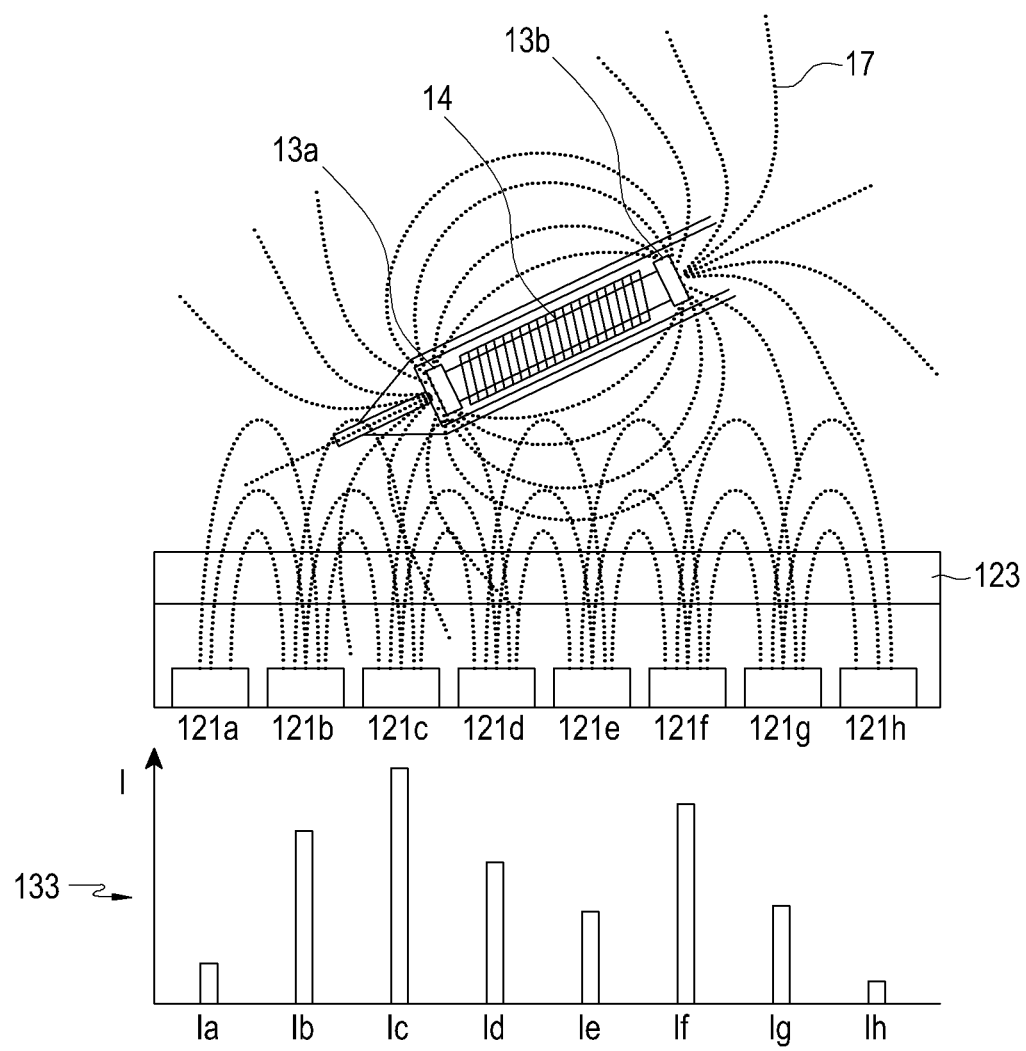

Similarly, as illustrated in FIG. 4D, as the pen input device 10 enters the range of the predetermined area, in which the predetermined resonant signal 125 exists, while keeping a predetermined angle with the multi-input panel 121, i.e., as the first and second ends 13a and 13b of the core 13 simultaneously enter the range of the predetermined area, in which the predetermined resonant signal 125 exists, the electromagnetic field 17 may be formed in the vicinity of the core 13 by the resonance circuit of the pen input device 10. Therefore, the resonance circuit of the pen input device 10 may be electromagnetically coupled to the resonance circuit of the multi-input panel 121. Among the plurality of resonant antennas 121a to 121h mounted in the resonance circuit of the multi-input panel 121, the third resonant antenna 121c closest to the first end 13a of the core 13 and the sixth resonant antenna 121f closest to the second end 13b of the core 13 may be strongly coupled to the resonance circuit of the pen input device 10. However, since the pen input device 10 keeps the predetermined angle with the multi-input panel 121, a current value If measured at the sixth resonant antenna 121f closest to the second end 13b of the core 13 may be smaller than a current Ic measured at the third resonant antenna 121c closest to the first end 13a of the core 13 as illustrated in a graph 133. Therefore, the multi-input screen controller 130 may determine that a pen input event (for example, a pen multi-touch event) made by the pen input device 10 has occurred in two areas where the third and sixth resonant antennas 121c and 121f are prepared, but the touch screen controller 130 may determine the type of the pen multi-touch event to be different from that in FIG. 4C.

Figure 5:
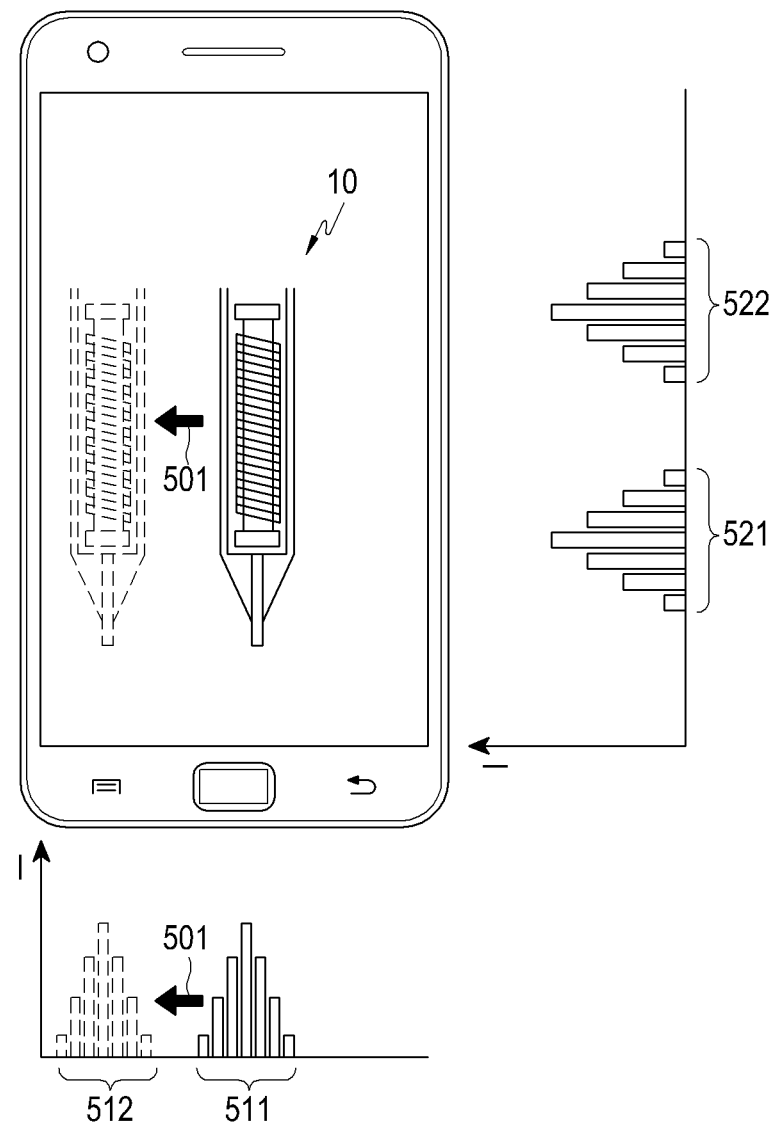
FIG. 5 illustrates a drag input by a pen input event handling method according to an embodiment of the present disclosure.

FIG. 5 illustrates a drag input by a pen input event handling method according to an embodiment of the present disclosure.

In addition to an action corresponding to this pen multi-input event, a gesture input may occur such as being dragged or rotated in a predetermined direction. For example, referring to FIG. 5, as a drag gesture is input in a predetermined direction 501 by the pen input device 10, the controller 110 may determine that after a pen multi-input event occurred in two areas (511, 521) and (511, 522) by the pen input device 10, the pen input device 10 has moved to new areas (512, 521) and (512, 522) in the predetermined direction 501 by the drag gesture. In response, the controller 110 may handle a predetermined operation corresponding to a drag gesture made by the pen multi-input event.

Referring back to FIG. 1, the storage unit 140, under control of the controller 110, may store the signal or data that is input/output to correspond to an operation of the multi-input screen 120. The storage unit 140 may store a control program and applications used for control of the electronic device 100 or the controller 110.

The storage unit 140 may store an operation corresponding to a pen input event, for example, a pen multi-input input event, as the data needed to handle a pen input event driving method according to an embodiment of the present disclosure. In other words, the storage unit 140 may store an operation which is set to correspond to each of a pen multi-input event occurring in the home screen, a pen multi-input gesture event occurring in the home screen, a pen multi-input event occurring in a specific application, and a pen multi-input gesture event occurring in the specific application.

The term 'storage unit' may be construed to include the storage unit 140; the ROM 112 and the RAM 113 in the controller 110; or a memory card (not shown) (for example, a Secure Digital (SD) card, a memory stick, or the like) mounted in the electronic device 100. The storage unit may include a non-volatile memory, a volatile memory, a Hard Disk Drive (HDD), a Solid State Drive (SSD), or any other similar and/or suitable storage unit.

The power supply unit 150, under control of the controller 110, may supply power to one or multiple batteries (not shown) mounted in the housing of the electronic device 100. The one or multiple batteries (not shown) may supply power to the electronic device 100. The power supply unit 150 may supply, to the electronic device 100, the power that is received from the external power source (not shown) through a wired cable connected to a connector (not shown) mounted in the electronic device 100. The power supply unit 150 may supply, to the electronic device 100, the power that is wirelessly received from the external power source by wireless charging technology.

The electronic device 100 according to an embodiment of the present disclosure may further include the communication module 170 and the Input/Output (I/O) module 160.

The communication module 170 may include at least one of a cellular module, a wireless Local Area Network (LAN) module, a short-range communication module, or any other similar and/or suitable communication module.

The cellular module, under control of the controller 110, may connect the electronic device 100 to external devices by mobile communication using one or multiple antennas (not shown). The cellular module may exchange radio signals for voice call, video call, Short Message Service (SMS) or Multimedia Messaging Service (MMS), with a cellular phone (not shown), a smart phone (not shown), a tablet Personal Computer (PC) (not shown) or other devices (not shown), phone numbers of which are entered in the electronic device 100.

The wireless LAN module, under control of the controller 110, may access the Internet in a place where a wireless Access Point (AP) (not shown) is installed. The wireless LAN module may support the wireless LAN standard IEEE 802.11x defined by the Institute of Electrical and Electronic Engineers (IEEE). The wireless LAN module may drive a Wi-Fi Positioning System (WPS) that determines location information of its electronic device 100 using the location information provided by a wireless AP, to which the wireless LAN module is wirelessly connected.

The short-range communication module is a module for wirelessly handling short-range communication with the electronic device 100. The short-range communication module, under control of the controller 110, may handle communication based on a short-range communication scheme such as Bluetooth, Infrared Data Association (IrDA), Wi-Fi Direct, and Near Field Communication (NFC).

The I/O module 160 may include one or more of at least one button 161, a speaker 162, a vibration motor 163, a keypad 164, or any other similar and/or suitable I/O module.

The at least one button 161 may be formed on the front, side or rear of the housing of the electronic device 100, and may include at least one of a power/lock button (not shown), a volume button (not shown), a menu button (not shown), a home button (not shown), a back button (not shown), a search button (not shown), and any other similar and/or suitable button.

The speaker 162, under control of the controller 110, may output the sound corresponding to various signals (for example, a radio signal, a broadcast signal, and the like) from the cellular module, the wireless LAN module and the short-range communication module, to the outside of the electronic device 100. One or multiple speakers 162 may be formed in a proper position or positions of the housing of the electronic device 100.

The vibration motor 163, under control of the controller 110, may convert electrical signals into mechanical vibrations. One or multiple vibration motors 163 may be formed in the housing of the electronic device 100.

The keypad 164 may be formed on the front, side or rear of the housing of the electronic device 100. The keypad 164 may be a software driven keypad that is implemented using the multi-input screen 120.

The speaker 162 and the vibration motor 163 may operate depending on the settings of a volume operating mode of the electronic device 100. For example, the volume operating mode of the electronic device 100 may be operated as a sound mode, a vibration mode, a sound & vibration mode, a mute mode or the like, and may be set as one of these modes. Based on the mode as which the volume operating mode is set, the controller 110 may output a signal for instructing activation of the speaker 162 or the vibration motor 163 depending on the function performed by the electronic device 100. For example, if a call is received by the cellular module (or the wireless LAN module or the short-range communication module) while the volume operating mode is set as a sound mode, the controller 110 may provide an audio signal indicating the reception of a call to the speaker 162, so the speaker 162 may output the audio signal. Otherwise, if a call is received by the cellular module (or the wireless LAN module or the short-range communication module) while the volume operating mode is set as a vibration mode, the controller 110 may provide a vibration signal indicating the reception of a call to the vibration motor 163, so the vibration motor 163 may output the vibration signal. Although it is assumed in an embodiment of the present disclosure that the controller 110 controls operations of the speaker 162 and the vibration motor 163 in response to the reception of a call to output a signal corresponding thereto, the present disclosure is not limited thereto, and those of ordinary skilled in the art will recognize that various changes and modifications of the various embodiments described herein can be made without departing from the scope and spirit of the disclosure. For example, the controller 110 may provide the output (for example, an audio signal or a vibration signal), which is responsive to an input action made by the user on the multi-input screen 120, and a continuous movement of an input on the multi-input screen 120.

Various methods according to various embodiments of the present disclosure may be implemented in the form of program command that can be executed by various computer means, and recorded in a computer-readable medium (for example, the ROM 112, the RAM 113, the storage unit 140, or the like). The computer-readable medium may include program commands, data files, data structure and the like independently or in combination. Although the program commands recorded in the medium are program commands designed and configured for the present disclosure, the program commands may be program commands known to those skilled in the field of computer software.

In addition, various methods according to various embodiments of the present disclosure may be implemented in the form of program command and stored in the storage unit 140 of the electronic device 100, and the program commands may be temporarily stored in the RAM 113 included in the controller 110, for execution of the methods according to various embodiments of the present disclosure. Accordingly, in response to the program commands corresponding to the methods according to various embodiments of the present disclosure, the controller 110 may control the hardware components included in the electronic device 100, store the data generated during execution of the methods according to various embodiments of the present disclosure, in the storage unit 140 temporarily or permanently, and provide a UI(s) used for execution of the methods according to various embodiments of the present disclosure, to the multi-input screen controller 130.

An operation of a pen input event handling method according to an embodiment of the present disclosure will be described below with reference to the above-described structure of the electronic device 100.

The pen input event handling method according to an embodiment of the present disclosure may initiate its operation as a multi-input panel of the multi-input screen is activated. For example, the controller 110 may activate the multi-input screen 120 and the multi-input screen controller 130 and initiate the operation of the pen input event handling method according to an embodiment of the present disclosure, as the button 161 mounted on the electronic device 100 is entered (or pressed), a call is received from the outside, or an event (for example, occurrence of a push notification set in an application, occurrence of time alarm, reception of messaging data, and the like) occurs, which satisfies the predetermined alarm conditions.

Figure 6:
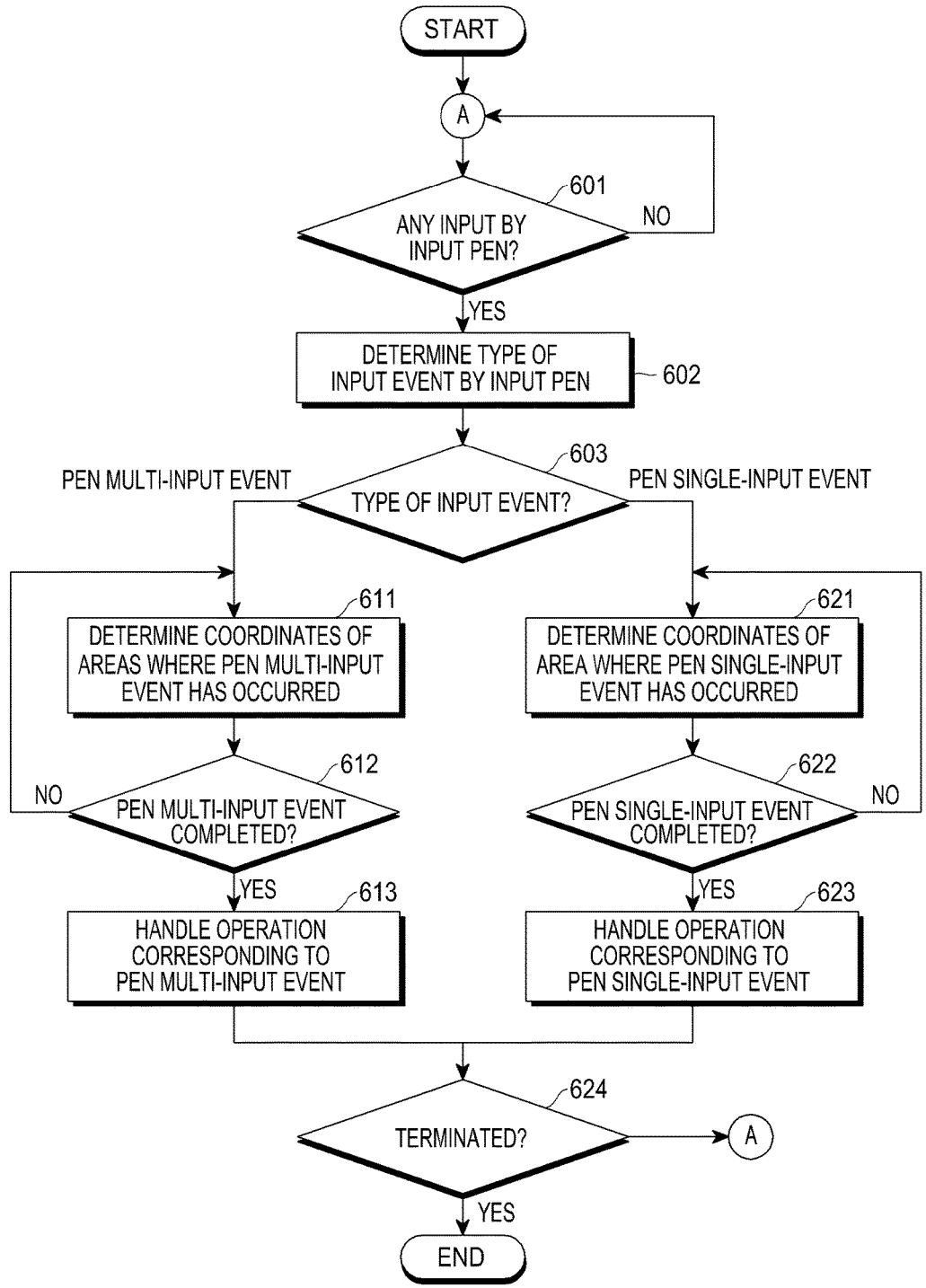
FIG. 6 is a flowchart illustrating an operation of a pen input event handling method according to an embodiment of the present disclosure.

FIG. 6 is a flowchart illustrating an operation of a pen input event handling method according to an embodiment of the present disclosure.

Referring to FIG. 6, the controller 110 may determine in operation 601 whether an input event by the pen input device 10 has occurred. For example, the multi-input panel 121 may radiate a resonant signal having a predetermined frequency by sequentially enabling resonant antennas arranged horizontally and vertically on the multi-input panel 121 based on the driving signal provided by the multi-input screen controller 130. The multi-input screen controller 130 may monitor current values of the resonant antennas, and determine that a pen input event by the pen input device 10 has occurred in the area where a resonant antenna whose current value exceeds a predetermined value is arranged.

Although it is assumed in an embodiment of the present disclosure that a pen input event by the pen input device 10 is determined using the current value, the present disclosure is not limited thereto, and the pen input event by the pen input device 10 may be determined using a voltage value instead of the current value.

The pen input device 10 may be configured to include a resonance circuit corresponding to the resonant signal having the predetermined frequency, and the resonance circuit may include the core 13 and the coil 14. The resonance circuit of the pen input device 10 may generate a resonant signal of a frequency corresponding to that generated by the electromagnetic induction by the resonant signal radiated from the multi-input panel 121. Accordingly, the pen input device 10 may be electromagnetically coupled to the resonant antennas of the multi-input panel 121, forming a current transmission path. In this case, more electromagnetic fields may be formed at both ends of the core 13 mounted in the pen input device 10, forming a high current density. Therefore, a pen single-input event or a pen multi-input event may occur, depending on how both ends of the core 13 mounted in the pen input device 10 are placed with respect to the multi-input panel 121. For example, if the pen input device 10 is placed approximately perpendicular to the multi-input panel 121 (see FIG. 4B), only one of both ends of the core 13 mounted in the pen input device 10 may approach the multi-input panel 121. Thus, the multi-input screen controller 130 may detect one resonant antenna having a current value exceeding the predetermined value and provide the detection results to the controller 110, and the controller 110 may determine an occurrence of a pen single-input event. On the other hand, if the pen input device 10 is placed approximately in parallel to the multi-input panel 121 (see FIG. 4C), both ends of the core 13 mounted in the pen input device 10 may approach the multi-input panel 121. Thus, the multi-input screen controller 130 may detect two resonant antennas having a current value exceeding the predetermined value and provide the detection results to the controller 110, and the controller 110 may determine an occurrence of a pen multi-input event. Taking this into consideration, in operation 602, the controller 110 may determine whether the input event by the pen input device 10 is a pen single-input event or a pen multi-input event.

Although it is assumed in an embodiment of the present disclosure that a pen input event is detected using a plurality of input values, which are induced in the input panel 121 by the flux distribution of an electromagnetic field formed between both ends of the core 13 mounted in the pen input device 10, the present disclosure is not limited thereto. As an alternative, the pen input device 10 may include a plurality of resonance circuits having different frequencies. For example, the pen input device 10 may include a first resonance circuit (for example, a core and a coil) having a first frequency, and a second resonance circuit (for example, a core and a coil) having a second frequency. The multi-input panel 121 may sequentially radiate a resonant signal of the first frequency and a resonant signal of the second frequency, and detect a change in current value or voltage value corresponding thereto, making it possible to detect a pen input event. Taking this into consideration, the multi-input panel 121 and the multi-input screen controller 130 may detect a pen multi-input event as a pen input event corresponding to both of the resonant signal of the first frequency and the resonant signal of the second frequency is detected, and the multi-input panel 121 and the multi-input screen controller 130 may detect a pen single-input event as a pen input event corresponding to any one of the resonant signal of the first frequency and the resonant signal of the second frequency is detected.

If the input event by the pen input device 10 is a pen single-input event in operation 603, the controller 110 may determine, in operation 621, coordinates of area where the pen single-input event provided by the multi-input screen controller 130 has occurred.

In addition to an action corresponding to this pen single-input event, a gesture input may occur such as being dragged or rotated in a predetermined direction. Therefore, the controller 110 may determine in operation 622 whether the pen single-input event has been completed, by determining whether an additional pen single-input event has occurred within a predetermined time.

Next, if the pen single-input event has been completed, the controller 110 may handle an operation corresponding to the pen single-input event in operation 623.

If the input event by the pen input device 10 is a pen multi-input event in operation 603, the controller 110 may determine, in operation 611, coordinates of two areas where the pen multi-input event provided by the multi-input screen controller 130 has occurred.

In addition to an action corresponding to this pen multi-input event, a gesture input may occur such as being dragged or rotated in a predetermined direction. Therefore, the controller 110 may determine in operation 612 whether the pen multi-input event has been completed, by determining whether an additional pen multi-input event has occurred within a predetermined time.

Next, if the pen multi-input event has been completed, the controller 110 may handle an operation corresponding to the pen multi-input event in operation 613.

After operation 613 or 623, the controller 110 may determine, in operation 624, whether to terminate the procedure of FIG. 6. If the controller 110 determines to terminate the procedure of FIG. 6, the controller 110 terminates the procedure of FIG. 6. Otherwise, if the controller 110 determines not to terminate the procedure of FIG. 6, the controller 110 returns to operation 601.

FIGS. 7A to 7E illustrate operations corresponding to pen multi-input events used in a pen input event handling method according to an embodiment of the present disclosure.

Figure 7A:
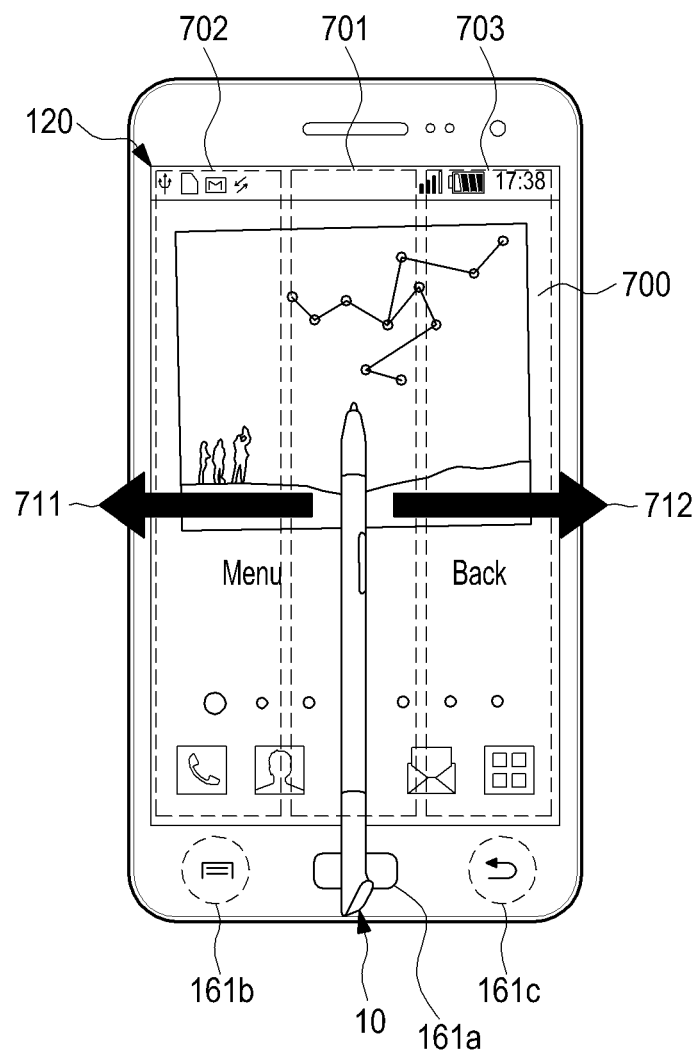
FIGS. 7A, 7B, 7C, 7D, and 7E illustrate operations corresponding to pen multi-input events used in a pen input event handling method according to an embodiment of the present disclosure.

The multi-input screen 120 may be disposed in the center of the front of the electronic device 100. The multi-input screen 120 may be formed large to occupy most of the front of the electronic device 100. FIG. 7A illustrates a home screen 700 displayed on the multi-input screen 120. The home screen 700 may be a screen, which is displayed as a lock screen is released. The lock screen may be the first screen, which is displayed on the multi-input screen 120 when the electronic device 100 is powered on. The lock screen may be a screen that provides an environment in which the user may access the electronic device 100 by entering security information (for example, a password, a security pattern or the like) set by the user himself/herself. The lock screen may be released by a predetermined user input (for example, a password, a security pattern, an input event, a gesture input event, or the like), and may be switched to the home screen 700 as the lock screen is released. Under the multi-input screen 120 may be formed a Home button 161a, a Menu button 161b and a Back button 161c.

Basically, the Home button 161a may be used to display the main home screen on the multi-input screen 120. For example, if the Home button 161a is selected while any home screen different from the main home screen or a menu screen is displayed on the multi-input screen 120, then the main home screen may be displayed on the multi-input screen 120. If the Home button 161a is selected while applications are being executed on the multi-input screen 120, the main home screen may be displayed on the multi-input screen 120. The Home button 161a may be used to display the recently used applications on the multi-input screen 120, or to display a task manager.

The Menu button 161b may provide connection menus that can be used on the multi-input screen 120. The connection menus may include a widget add menu, a wallpaper change menu, a search menu, an edit menu, a preference menu and the like.

The Back button 161c may be used to display the previous screen of the currently running screen, or to terminate the most recently used application.

As illustrated in FIG. 7A, if a pen multi-input event occurs using the pen 10 on the multi-input screen 120 while the home screen 700 is displayed on the multi-input screen 120, an operation corresponding to an input of the Home button 161a may be handled. If a pen multi-input event occurs, which includes a drag gesture input in a direction 711 of the Menu button 161b, an operation corresponding to an input of the Menu button 161b may be handled. If a pen multi-input event occurs, which includes a drag gesture input in a direction 712 of the Back button 161c, an operation corresponding to an input of the Back button 161c may be handled.

As another example, if a pen multi-input event occurs on/over an area 701 which extends on the multi-input screen 120 from the part where the Home button 161a is prepared, an operation corresponding to an input of the Home button 161a may be handled.

If a pen multi-input event occurs on/over an area 702 that extends from the part where the Menu button 161b is prepared, an operation corresponding to an input of the Menu button 161b may be handled. If a pen multi-input event occurs on an area 703 that extends from the part where the Back button 161c is prepared, an operation corresponding to an input of the Back button 161c may be handled.

Figure 7B:
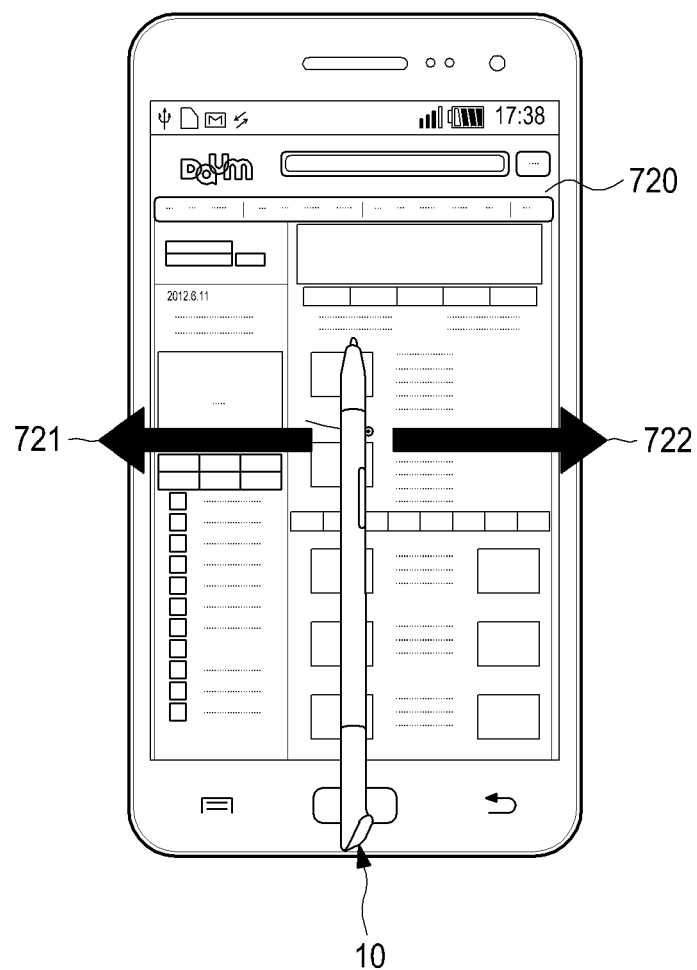

As illustrated in FIG. 7B, if a pen multi-input event occurs using the pen 10, which includes a drag gesture input in a first direction 721, while a web page application is running, i.e., while a web page 720 is being displayed on the multi-input screen 120, an operation of determining and displaying a previous page of the currently displayed web page may be handled. On the other hand, if a pen multi-input event occurs, which includes a drag gesture input in a second direction 722 being opposite to the first direction 721, while the web page 720 is being displayed on the multi-input screen 120, an operation of determining and displaying the next page of the currently displayed web page may be handled.

Figure 7C:
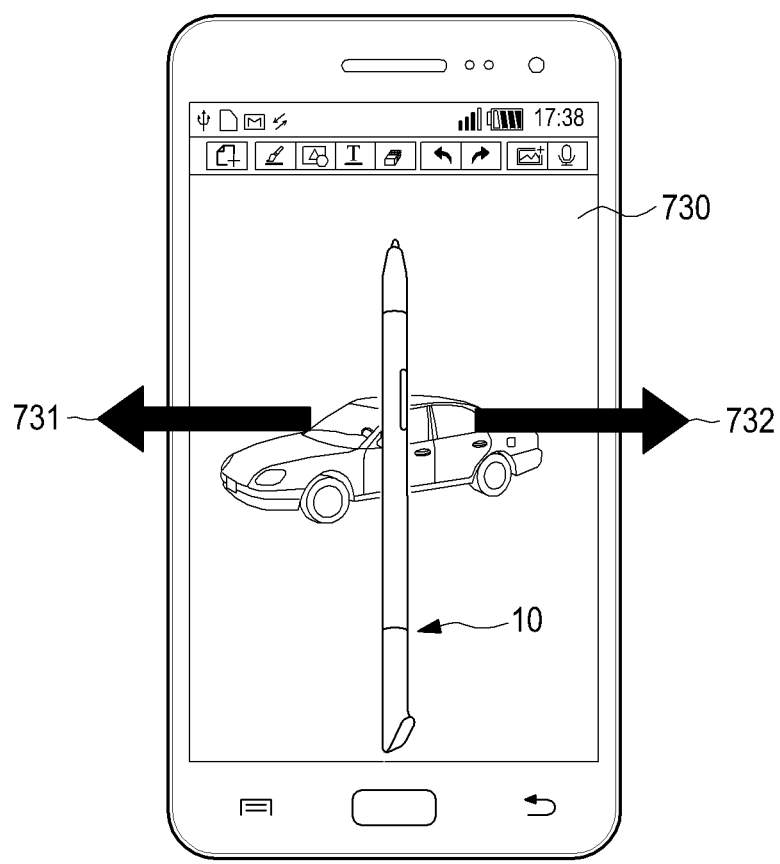

As illustrated in FIG. 7C, if a pen multi-input event occurs using the pen 10, which includes a drag gesture input in a first direction 731, while a Drawing (or Note) application is running, i.e., while a Drawing (or Note) page 730 is being displayed on the multi-input screen 120, an operation of enlarging (or zooming in) the currently displayed Drawing (or Note) page 730 may be handled in response to the drag gesture input. On the other hand, if a pen multi-input event occurs, which includes a drag gesture input in a second direction 732 being opposite to the first direction 731, while the Drawing (or Note) page 730 is being displayed on the multi-input screen 120, an operation of reducing (or zooming out) the currently displayed Drawing (or Note) page 730 may be handled in response to the drag gesture input.

Figure 7D:
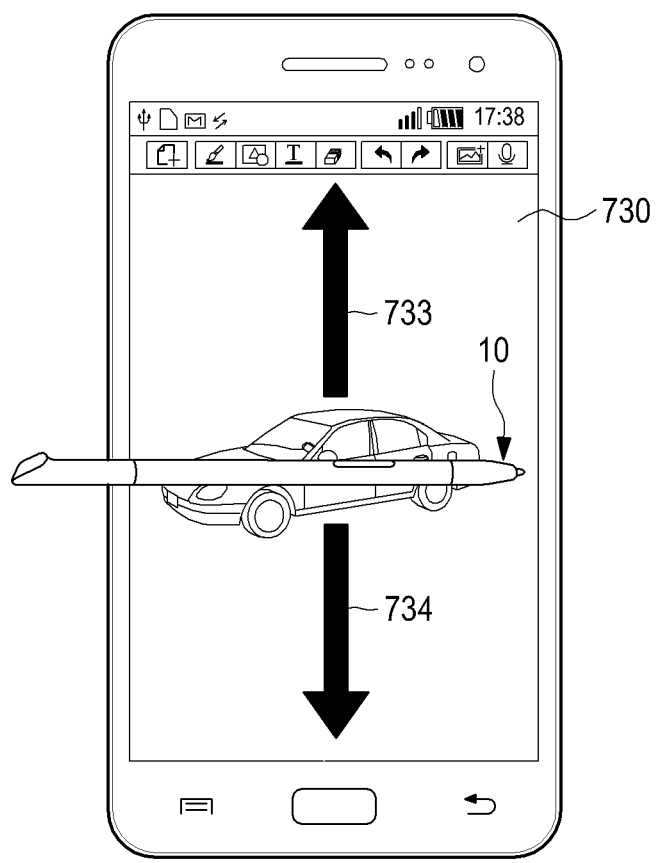

As illustrated in FIG. 7D, if a pen multi-input event occurs using the pen 10, which includes a drag gesture input in a third direction 733, while the Drawing (or Note) page 730 is being displayed on the multi-input screen 120, an operation of sending the currently displayed Drawing (or Note) page 730 to another user through a messaging application may be handled. On the other hand, if a pen multi-input event occurs, which includes a drag gesture input in a fourth direction 734, while the Drawing (or Note) page 730 is being displayed on the multi-input screen 120, an operation of deleting an object (for example, a picture, text, and the like) contained in the currently displayed Drawing (or Note) page 730 may be handled. As an alternative, an operation of capturing the currently displayed Drawing (or Note) page 730, or sharing it with other users through other applications (for example, a social media application and the like) may be handled in response to a pen multi-input event including a drag gesture input in the third direction 733 or the fourth direction 734.

Figure 7E:
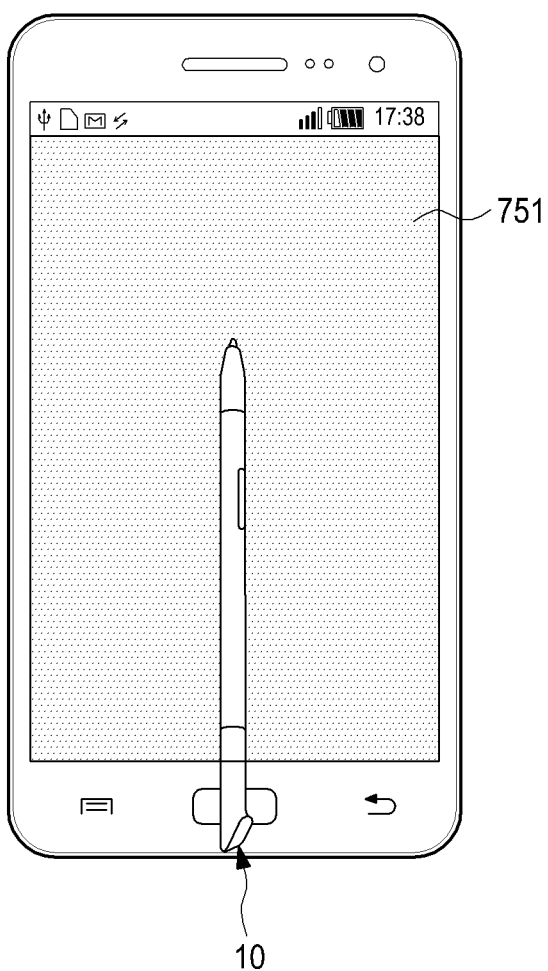

As illustrated in FIG. 7E, if the pen input device 10 remains on the multi-input screen 120 without moving for a predetermined time, i.e., if a pen multi-input event occurred in a predetermine area, and then, the pen multi-input event occurred in the predetermined area has remained without moving for the predetermined time, the controller 110 may handle an operation of switching an operation mode of the electronic device 100 to a standby mode, and terminating the display operation of the multi-input screen 120 (see 751). As an alternative, if a pen multi-input event occurred in a predetermine area, and then, the pen multi-input event occurred in the predetermined area has remained without moving for the predetermined time, the controller 110 may handle an operation of switching the display state of the multi-input screen 120 to the lock screen.

If a pen multi-input event no longer occurs in the predetermined area, the controller 110 may handle the standby mode and the display operation. For example, if a pen multi-input event no longer occurs in the predetermined area (for example, if the pen input is released, or if a pen single-input event occurs), the controller 110 may activate the display of the multi-input screen 120, and display the lock screen or the home screen on the multi-input screen 120. As an alternative, the controller 110 may determine an application that was running before its operation mode was switched to the standby mode, and display information provided by the determined application on the multi-input screen 120.

Referring again to FIG. 6, an operation of determining coordinates of two areas, in which a pen multi-input event occurs, is illustrated in operation 611. However, in detecting the areas where a pen multi-input event occurs, the current values may be determined to be different, which are detected in two areas where the pen multi-input event occurs. Therefore, operation 613 of setting the type of the pen multi-input event or handling the operation corresponding to the pen multi-input event taking this into consideration may be changed in various ways depending on the two areas whose current values may be determined to be different.

For example, the two areas whether a pen multi-input event has occurred may be determined to be identical to or different from each other in terms of current value, and the type of the pen multi-input event may be set different depending on whether the two areas are identical to or different from each other in terms of the current value.

Figure 8A:
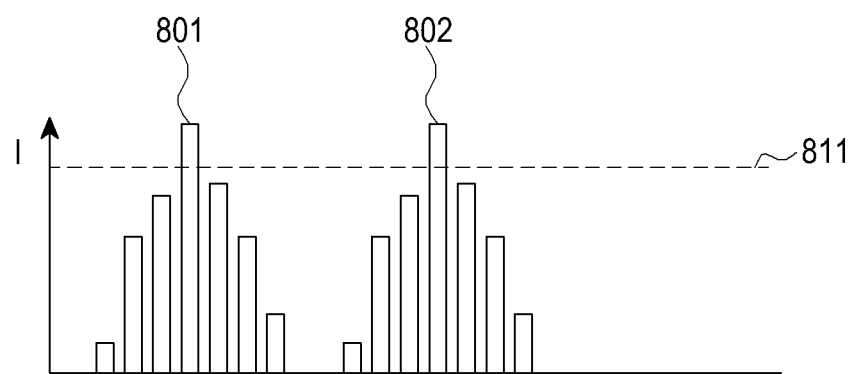
FIGS. 8A and 8B illustrate current values detected by a pen input event handling method according to an embodiment of the present disclosure.
Figure 8B:
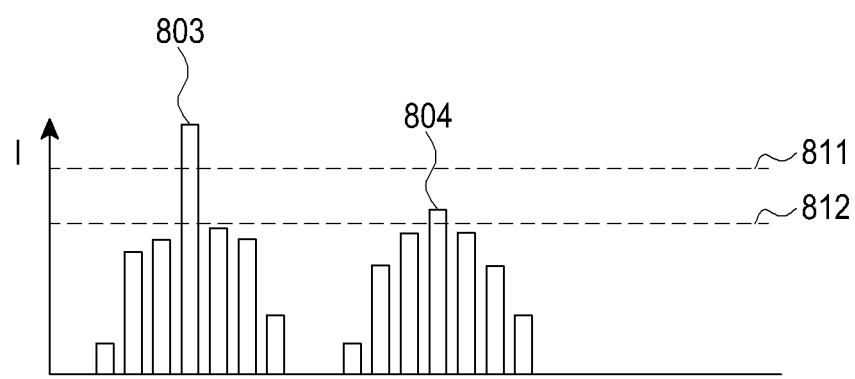

FIGS. 8A and 8B illustrate current values detected by a pen input event handling method according to an embodiment of the present disclosure.

Referring to FIG. 8A, it is illustrated that both of current values 801 and 802 detected in two different areas exceed a predetermined first threshold 811. In this way, if both of the current values 801 and 802 detected in two different areas exceed the first threshold 811, the controller 110 may determine the type of the pen multi-input event as a first pen multi-input event, determining that the two areas where a pen multi-input event has occurred are identical to each other in terms of the current value.

Referring to FIG. 8B, since both of current values 803 and 804 detected in two different areas exceed a second threshold 812 used to determine whether a pen multi-input event occurs, the controller 110 may determine that a pen multi-input event has occurred. However, it is noted that only the current value 803 detected in a first area exceeds the first threshold 811 and the current value 804 detected in a second area does not exceed the first threshold 811. In this case, the controller 110 may determine the type of the pen multi-input event as a second pen multi-input event, determining that the two areas are different from each other in terms of the current value.

Referring again to FIG. 6, in proceeding with operation 613 of handling an operation corresponding to the pen multi-input event, the controller 110 may reflect whether the type of the pen multi-input event is the first pen multi-input event or the second pen multi-input event. For example, it will be apparent to those of ordinary skill in the art that even though the same pen multi-input event occurs in the same area, different operations may be handled for the first pen multi-input event and the second pen multi-input event.

For example, referring to FIG. 7E, while the screen is turned off as the display operation of the multi-input screen 120 is terminated, the controller 110 may detect the occurrence of the second pen multi-input event, and handle the standby mode and the display operation. In other words, in response to the occurrence of the second pen multi-input event, the controller 110 may activate the display of the turned-off multi-input screen 120, and display the lock screen or the home screen on the multi-input screen 120. As an alternative, the controller 110 may determine or check an application that was running before its operation mode was switched to the standby mode, and display information provided by the determined application on the multi-input screen 120.

Although it is assumed in an embodiment of the present disclosure that a pen multi-input event is detected using an input value induced in the multi-input panel 121 by flux distribution formed between both ends of the core 13 mounted in the pen input unit 10, the present disclosure is not limited thereto, and it will be apparent to those of ordinary skill in the art that various modifications can be made on the assumption that a pen multi-input event is detected. For example, the pen input device 10 may include a plurality of core resonance circuits having different impedances, and as the multi-input panel 121 alternately generates different frequencies, input values induced in the plurality of resonance circuits having different impedances are all detected, making it possible to determine the pen multi-input event.

It can be appreciated that various embodiments of the present disclosure may be implemented in the form of hardware, software, or a combination thereof. The software may be stored in a volatile or non-volatile storage device (for example, an erasable or re-writable ROM), a memory (for example, a RAM, a memory chip, a memory device, or a memory Integrated Circuit (IC)), or an optically or magnetically recordable machine (for example, computer)-readable storage medium (for example, a Compact Disk (CD), a Digital Versatile Disk (DVD), a magnetic disk, or magnetic tape). The method according to an embodiment of the present disclosure may be implemented by a computer or a mobile terminal that includes at least one controller and a non-transitory memory. The non-transitory memory may be an example of a non-transitory machine-readable storage medium suitable to store a program or programs including instructions for implementing various embodiments of the present disclosure. Therefore, the method according to an embodiment of the present disclosure may include a program including codes for implementing the method or apparatus as defined by the appended claims, and a non-transitory machine (for example, a computer)-readable storage medium storing the program. In addition, the program may be electronically transmitted through any medium such as communication signals that are transmitted via wired/wireless connections, and the present disclosure may include equivalents thereof.

The mobile terminal may receive and store the program from a program server to which the mobile terminal is connected by wire or wirelessly. The program server may include a non-transitory memory for storing a program including instructions for executing the pen input event handling method, and the information needed for the pen input event handling method, a communication unit for performing wired/wireless communication, and a controller for controlling transmission of the program. Upon receiving a request for the program from the electronic device, the program server may provide the program to the electronic device by wires or wirelessly. The program server may be configured to provide the program to the electronic device by wires or wirelessly, even if there is no request for the program from the electronic device, for example, if the electronic device is located within a specific place.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   an electromagnetic resonant panel;
   an electromagnetic controller configured to detect input values, which are induced in multiple locations of the electromagnetic resonant panel by at least one resonant circuit of an input pen; and
   at least one processor configured to:
   detect a pen multi-input event including a first input value and a second input value induced in two locations by the at least one resonant circuit of the input pen, when both of the first input value and the second input value exceed a first threshold,
   determine an input type of the pen multi-input event according to whether levels of the first input value and the second input value are identical to or different from each other based on a second threshold greater than the first threshold, and
   control an operation corresponding to the determined input type of the pen multi-input event
   wherein the at least one processor is configured to:
   determine the input type as a first pen multi-input event by determining that the first input value and the second input value are identical to each other, if both of the first input value and the second input value exceed the second threshold, and
   determine the input type as a second pen multi-input event by determining that the first input value and the second input value are different from each other, if the first input value exceeds the second threshold and the second input value does not exceed the second threshold.

2. The electronic device of claim 1, wherein the electromagnetic resonant panel forms a resonant signal of a predetermined frequency, and
   wherein the electromagnetic controller detects input values, which are induced in multiple locations of the electromagnetic resonant panel by flux distribution of an electromagnetic field formed in the at least one resonant circuit of the input pen.

3. The electronic device of claim 1, wherein the electromagnetic resonant panel forms a resonant signal of a first frequency and a resonant signal of a second frequency, and
   wherein the electromagnetic controller detects input values, which are induced in multiple locations of the electromagnetic resonant panel by flux distribution of an electromagnetic field, which is formed in a first resonance circuit of the input pen and coupled with a first frequency, and a second resonance circuit of the input pen and coupled with the second frequency.

4. The electronic device of claim 1, wherein the pen multi-input event comprises a pen multi-input gesture and the at least one processor is configured to control an operation corresponding to the pen multi-input gesture.

5. The electronic device of claim 4, wherein the operation corresponding to the pen multi-input gesture comprises:
   an operation of enlarging data being displayed, if the pen multi-input gesture moves in a first direction; and
   an operation of reducing data being displayed, if the pen multi-input gesture moves in a second direction being opposite to the first direction.

6. The electronic device of claim 4, wherein the operation corresponding to the pen multi-input gesture comprises:
   an operation of determining and displaying a previous web page preceding a currently displayed web page, if the pen multi-input gesture moves in a first direction; and
   an operation of determining and displaying a next web page following the currently displayed web page, if the pen multi-input gesture moves in a second direction being opposite to the first direction.

7. The electronic device of claim 4, wherein the operation corresponding to the pen multi-input gesture comprises:

an operation of handling a predetermined first key input, if the pen multi-input gesture moves in a direction of a first key; and an operation of handling a predetermined second key input, if the pen multi-input gesture moves in a direction of a second key being different from the first key.

8. The electronic device of claim 4, wherein the operation corresponding to the pen multi-input gesture comprises an operation of deleting data that is input in a running application.

9. The electronic device of claim 4, wherein the operation corresponding to the pen multi-input gesture comprises an operation of transmitting messaging data including data that is input in a running application.

10. The electronic device of claim 1, wherein the at least one processor is configured to turn off a display if the pen multi-input event occurs in a same area for a predetermined amount of time.

11. The electronic device of claim 10, wherein the at least one processor is configured to control an operation of displaying a lock screen on the display, if the pen multi-input event no longer occurs in the same area.

12. The electronic device of claim 1, wherein the at least one processor is configured to control:

an operation of storing running information and turning off the display, if the pen multi-input event occurs in a same area for a predetermined amount of time; and display of the stored information on the display, if the pen multi-input event no longer occurs in the same area.

13. A method for handling a pen input, the method comprising:

providing a driving signal for an electromagnetic resonant panel;

detecting input values, which are induced in multiple locations of the electromagnetic resonant panel by at least one resonant circuit of an input pen;

detecting a pen multi-input event including a first input value and a second input value induced in two locations by the at least one resonant circuit of the input pen, when both of the first input value and the second input value exceed a first threshold;

determining an input type of the pen multi-input event according to whether levels of the first input value and the second input value are identical to or different from each other based on a second threshold greater than the first threshold; and controlling an operation corresponding to the determined input type of the pen multi-input event, wherein the determining of the input type of the pen multi-input event comprises:

determining the input type as a first pen multi-input event by determining that the first input value and the second input value are identical to each other, if both of the first input value and the second input value exceed the second threshold, and determining the input type as a second pen multi-input event by determining that the first input value and the second input value are different from each other, if the first input value exceeds the second threshold and the second input value does not exceed the second threshold.

14. A non-transitory computer-readable storage medium storing at least one program for execution by at least one processor to perform the method of claim 13.

15. The electronic device of claim 1, wherein the first input value comprises a value determined by an electromagnetic field formed between one end of a first resonant circuit of the at least one resonant circuit of the input pen and the electromagnetic resonant panel, and the second input value comprises a value determined by an electromagnetic field formed between another end of the first resonant circuit of the at least one resonant circuit of the input pen and the electromagnetic resonant panel.

16. The method of claim 13, wherein the first input value comprises a value determined by an electromagnetic field formed between one end of a first resonant circuit of the at least one resonant circuit of the input pen and the electromagnetic resonant panel, and the second input value comprises a value determined by an electromagnetic field formed between another end of the first resonant circuit of the at least one resonant circuit of the input pen and the electromagnetic resonant panel.

17. The electronic device of claim 1, wherein the pen multi-input event comprises a drag gesture input, and the at least one processor is configured to:

determine a type of the drag gesture input based on a direction of movement of the input pen which is parallel to a screen of the electromagnetic resonant panel; and control an operation corresponding to the determined type of the drag gesture input.

18. The electronic device of claim 17, wherein the at least one processor is configured to:

determine the type of the drag gesture input as a first type if the input pen is moved from side to side of the screen with a side of the input pen parallel to a side of the screen; and determine the type of the drag gesture input as a second type if the input pen is moved between top to bottom of the screen with a side of the input pen parallel to the top and bottom of the screen.

* * * * *